UNITED STATES PATENT OFFICE.

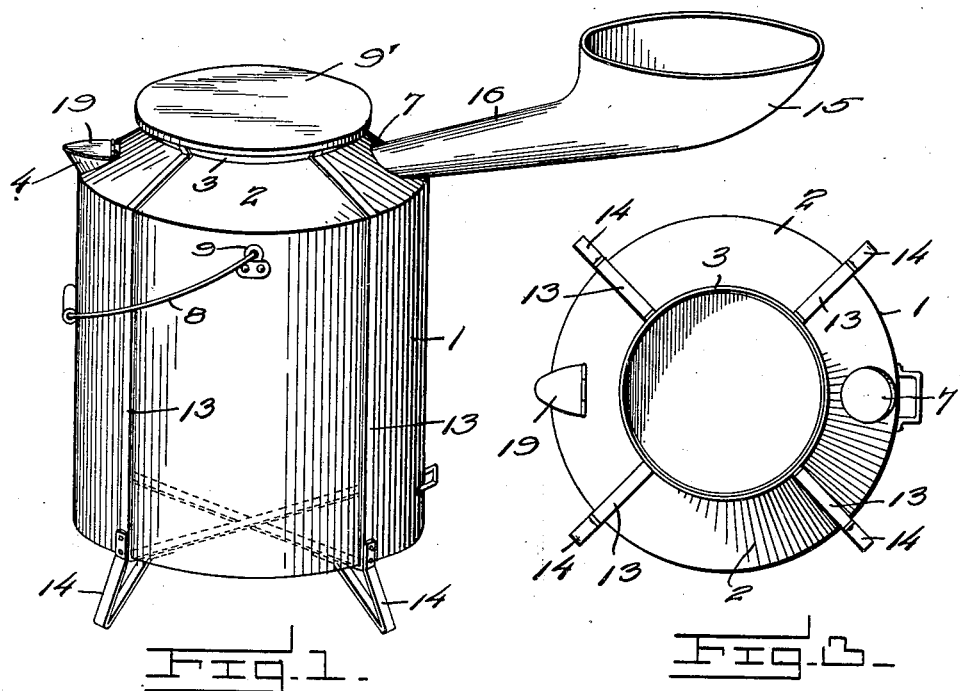
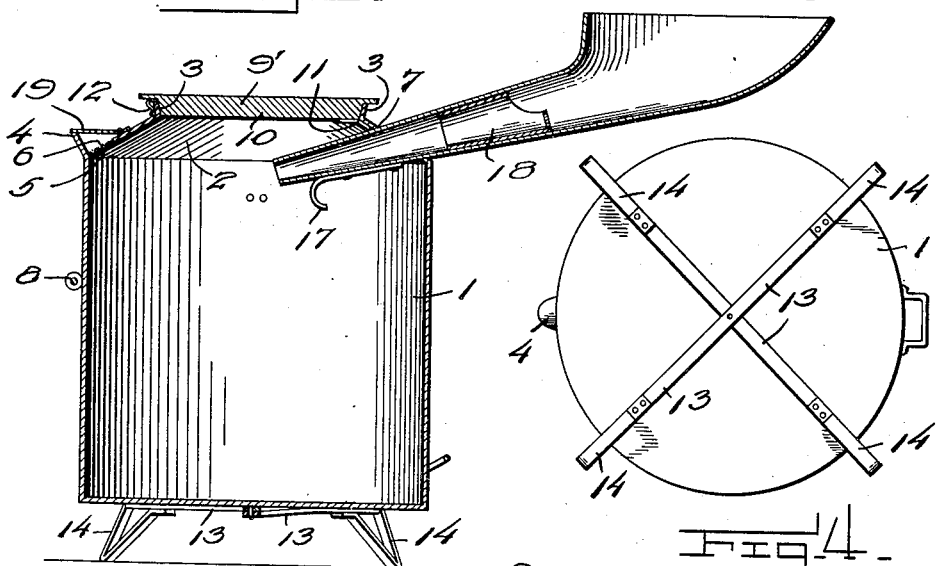
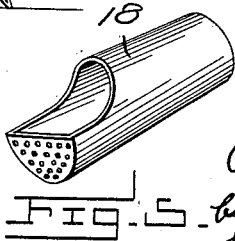

JAMES LA MAR AND HAROLD HARALSON, OF KILBOURN, WISCONSIN.

COMBINED MILK-PAIL AND MILKING-STOOL.

1,101,941. Specification of Letters Patent. Patented June 30, 1914.

Application filed March 29, 1913. Serial No. 757,514.

*To all whom it may concern:*

Be it known that we, JAMES LA MAR and HAROLD HARALSON, citizens of the United States, residing at Kilbourn, in the county of Columbia and State of Wisconsin, have invented certain new and useful Improvements in Combined Milk-Pails and Milking-Stools, of which the following is a specification.

This invention relates to milking apparatus, and has for its object to provide certain new and useful improvements in milk pails, whereby the same may be employed as a stool for the milker to sit on and conveniently direct the milk into the pail. Inasmuch as the pail is to be employed as a stool, it is proposed to strengthen and stiffen the same, so as to support the weight of the milker, without materially adding to the cost and weight of the pail, and without interfering with the use of the device in the ordinary capacity of a milk pail.

With these and other objects in view, the present invention consists in the combination and arrangement of parts, as will be hereinafter more fully described, shown in the drawings, and particularly set forth in the appended claims, it being understood that changes in the form, proportion, size and minor details may be made, within the scope of the claims, without departing from the spirit or sacrificing any of the advantages of the invention.

In the drawings, Figure 1 is a perspective view of a combined milk pail and milking stool embodying the features of the present invention. Fig. 2 is a vertical central longitudinal sectional view thereof. Fig. 3 is a top plan view with the cover removed. Fig. 4 is a bottom plan view of the device. Fig. 5 is a detail view of the funnel strainer.

Like characters of reference designate corresponding parts in each of the figures of the drawing.

The present device includes a pail 1 of suitable material, preferably galvanized tin. While any shape may be given to the pail, a cylindrical shape is preferred, the bottom of the pail being flat, and the top 2 tapered upwardly, or in the form of a truncated cone, having an open top surmounted by an upstanding peripheral rim or flange 3. At one side of the pail, and in the conical top thereof, is an outlet spout 4, the opening 5, through the top of the pail, having a strainer 6 therein, preferably a piece of metal gauze or other foraminous material. Diametrically opposite the outlet spout 4, there is an inlet opening 7, provided in the conical top of the pail, the use of which will be hereinafter explained. For convenience in carrying the pail, there is any common or preferred form of pail handle 8, each end of which is pivotally secured to one side of the pail by means of a pivot bracket 9, each of said pivot brackets being located midway between the spout 4 and the inlet opening 5.

The top of the pail is closed by means of a removable cover 9', preferably in the form of a block of wood, which is reduced on its under side, as at 10, so as to fit snugly within the rim 3, the top part of the cover which projects beyond the part 10, constituting a flange which rests upon the top edge of the rim 3. The depth of the part 10 is substantially the same as the height of the rim 3, and on the bottom of the cover there is provided a spring finger 11, which engages beneath the inclined top of the pail, and diametrically opposite the spring finger 11, there is a spring catch 12, designed to snap against the outside of the rim 3 and hold the cover detachably in place.

The pail is stiffened and strengthened by means of metallic straps or bars 13, suitably secured to the exterior of the pail and extending throughout the height thereof. Preferably, there are two such straps or bars, each extending the full length of the pail on diametrically opposite sides thereof and also extending diametrically across the bottom of the pail, whereby the two straps or bars cross one another at right angles across the bottom of the pail.

To support the pail at the desired height, there are provided four feet 14, each of which consists of a metal strap or bar bent intermediate of its ends into substantially U-shape with one end secured to one of the stiffening straps on the bottom of the pail and its other end secured to the same stiffening strap on the upright side of the pail.

In conjunction with the pail, there is a funnel 15, the stem 16 of which is tapered and is designed to be introduced through the inlet opening 7, so that the open top of the funnel will be in position to receive the milk when the milker is sitting upon the cover of the pail. A suitable hook 17 is provided upon the stem of the funnel so as to prevent the latter from being accidentally drawn entirely out of the pail.

Within the spout is a suitable strainer 18, in the form of a tapered tube, which can be introduced into the tapered stem of the funnel through the open top thereof, and may be conveniently removed from the funnel, as will be readily understood.

As will be seen the opening 7 is located entirely within the tapered or contracted top portion 2 of the receptacle. By reason of this location, the walls of the opening will act to support the spout in proper position without the necessity of providing auxiliary supports within the receptacle itself, thus leaving the interior of the receptacle substantially free from any projections which would tend to collect particles from the contents of the receptacle, enabling the interior of the receptacle to be properly cleansed without difficulty and insure cleanliness for the product, it being understood that a removal of the spout leaves the interior free from any inwardly projecting portions. Obviously there is required no external means for supporting the spout, the particular shape of the opening provided by its location being such as to provide the necessary support for the spout.

If desired, the spout 4 may be closed by a hinged cover 19.

Having thus described the invention, what is claimed and desired to be secured by Letters Patent, is:—

1. A combined milk pail and milk stool comprising a receptacle having a contracted upper portion terminating in an open top, a cover therefor, the top of the receptacle having an outlet spout and an inlet opening, stiffening straps or bars secured to the bottom of the receptacle and upon the sides thereof, and feet secured to said straps on the bottom and sides of the receptacle.

2. A combined milk pail and milking stool comprising a receptacle having a contracted upper portion terminating in an open top, a cover therefor, the top of the receptacle having an outlet spout and an inlet opening, stiffening straps secured to the bottom and sides of the receptacle, said straps crossing one another across the bottom of the receptacle and extending the full length of the receptacle on the exterior thereof, a removable cover for the open top of the receptacle and resting on the tops of the stiffening straps, and feet for the receptacle, each foot consisting of a substantially U-shaped metal strap having its ends secured to one of the stiffening straps on the bottom of the receptacle and at the side thereof.

3. A combined milk pail and milk stool comprising a receptacle having a contracted upper portion terminating in an open top, a cover therefor, the top of the receptacle having an outlet spout and an inlet opening, stiffening straps or bars provided upon the bottom of the receptacle and upon the sides thereof, feet secured to said straps on the bottom and sides of the receptacle, and a removable funnel adapted for insertion through the inlet opening.

4. In a combined milk pail and stool, and in combination, a receptacle having a tapered contracted upper portion terminating in an open top, a cover therefor, forming a seat, said contracted portion having an opening, and a removable funnel or spout adapted to extend into said receptacle through said opening, the walls of the opening forming a support for the spout when in position.

5. In a combined milk pail and stool, and in combination, a receptacle having a tapered contracted upper portion terminating in an open top, a cover therefor, forming a seat, said contracted portion having an opening, and a removable funnel or spout adapted to extend into said receptacle through said opening, the walls of the opening forming a support for the spout when in position, said spout being tapered inwardly with the upper portion having a length sufficient to deliver material at a point removed from the side walls of the receptacle, said inwardly projecting portion having means acting as a stop to prevent accidental withdrawal of the spout from the opening.

In testimony whereof we affix our signatures in presence of two witnesses.

JAMES LA MAR.
HAROLD HARALSON.

Witnesses:
  FRED A. SOELDNER,
  ED. BOOHER.

---

Copies of this patent may be obtained for five cents each, by addressing the "Commissioner of Patents, Washington, D. C."